United States Patent [19]
Billotte et al.

[11] Patent Number: 5,345,361
[45] Date of Patent: Sep. 6, 1994

[54] SHORTED TRIMMABLE COMPOSITE MULTILAYER CAPACITOR AND METHOD

[75] Inventors: Delmont L. Billotte, Madisonburg; Joel B. deNeuf, State College; Bruce E. Helms, Warrior's Mark, all of Pa.

[73] Assignee: Murata Erie North America, Inc., Smyrna, Ga.

[21] Appl. No.: 75,732

[22] Filed: Jun. 11, 1993

Related U.S. Application Data

[63] Continuation-in-part of Ser. No. 934,798, Aug. 24, 1992.

[51] Int. Cl.⁵ .............................. H01G 4/10
[52] U.S. Cl. .................... 361/313; 361/271; 361/303; 361/321.2; 29/25.03
[58] Field of Search .......... 29/25.42; 219/121.68, 219/121.69; 361/271, 272, 275.3, 277, 278, 301.4, 303, 306.3, 313, 321.1, 321.2, 321.3

[56] References Cited

U.S. PATENT DOCUMENTS

| | | | |
|---|---|---|---|
| 3,597,579 | 8/1971 | Lumley | 219/121 L |
| 3,766,616 | 10/1973 | Staudte | 361/271 |
| 4,035,695 | 7/1977 | Knutson et al. | 361/400 |
| 4,081,901 | 4/1978 | Miller | 29/831 |
| 4,190,854 | 2/1980 | Redfern | 357/51 |
| 4,217,570 | 8/1980 | Holmes | 338/308 |
| 4,288,776 | 9/1981 | Holmes | 338/308 |
| 4,306,246 | 12/1981 | Davies et al. | 357/36 |
| 4,439,814 | 3/1984 | Rhodes | 361/321 |
| 4,470,096 | 9/1984 | Guertin | 361/277 |
| 4,731,697 | 3/1988 | McLaney | 361/321.2 |
| 4,747,014 | 5/1988 | Kaino et al. | 361/321.1 |
| 4,792,779 | 12/1988 | Pond et al. | 388/195 |
| 4,853,755 | 8/1989 | Okabe et al. | 357/23.7 |
| 4,862,318 | 8/1989 | Galvagni et al. | 361/321 |
| 4,905,358 | 3/1990 | Einbinder | 29/25.42 |
| 4,924,064 | 5/1990 | Stormbom et al. | 219/121.69 |
| 4,928,838 | 5/1990 | Imamura | 219/121.69 |
| 4,990,742 | 2/1991 | Nishikawa et al. | 219/121.69 |
| 5,065,221 | 11/1991 | Imamura | 357/51 |
| 5,065,275 | 11/1991 | Fujisaki et al. | 361/321.4 |
| 5,081,439 | 1/1992 | Natzle et al. | 338/195 |
| 5,096,850 | 3/1992 | Lippitt, III | 437/173 |
| 5,159,524 | 10/1992 | Hasegawa et al. | 361/271 |

Primary Examiner—Bruce A. Reynolds
Assistant Examiner—Gregory L. Mills
Attorney, Agent, or Firm—Hopkins & Thomas

[57] ABSTRACT

A shorted trimmable composite multilayer capacitor (10) is initially shorted, but can be easily and efficiently unshorted and then functional trimmed while in a circuit. The capacitor (10) has a capacitor body (12) defined by a plurality of interleaved first and second electrodes (14, 16) spaced apart by ceramic. A trimmable outermost electrode (14') is situated on the capacitor body (12) and is capable of depletion by trimming for particularly selecting a capacitance associated with the capacitor (10). First and second terminations (24, 26) are disposed at first and second ends of the capacitor body (12) for connecting the capacitor (10) to a circuit. The first termination (24) is connected to the first electrodes (14), while the second termination is connected to the second electrode (16). Importantly, an interconnect bar (15) is disposed on the capacitor body (12) for connecting the outermost electrode (14') to the second termination (26) to thereby short the first and second terminations (24, 26). After the capacitor (10) has been placed in a circuit, the interconnect bar (15) can easily be eliminated to thereby unshort the capacitor (10), and the capacitor (10) can then be functionally trimmed via trimming the trimmable outermost electrode (14').

21 Claims, 3 Drawing Sheets

SHORTED TRIMMABLE COMPOSITE MULTILAYER CAPACITOR AND METHOD

RELATED APPLICATION

This document is a continuation-in-part of parent application Ser. No. 07/934,798, filed Aug. 24, 1992, by the same inventors herein entitled "Trimmable Composite Multilayer Capacitor and Method."

BACKGROUND OF THE INVENTION

1. Technical Field

The present invention generally relates to discrete electronic circuit elements, and more particularly, to a trimmable composite multilayer capacitor which is initially shorted but which can be unshorted and functionally trimmed while in a circuit.

2. Related Art

For many years, discrete electronic capacitors have been manufactured using multilayer technology. Generally, layers of conductive metallic electrodes are interleaved with layers of a dielectric material, for instance, ceramic, to form a main capacitor body of a multilayer capacitor. A termination, or a conductive electrical contact, is disposed at each end of the capacitor body for interfacing with the device. Moreover, each termination is connected to an exclusive set of alternate internal electrodes. In effect, the capacitor body responds like a group of capacitors connected in electrical parallel. The parallel connection is effectuated by the common termination interfacing alternate electrodes. The degree of capacitance achieved is a function of the number of interleaved layers, the geometric area and thickness of each layer, and the dielectric constant K of the dielectric layers.

The historical fabrication of multilayer ceramic (MLC) capacitors and some of the most recently developed methods for manufacturing the same are described in, for example, U.S. Pat. No. 5,046,236 to Wada et al. and U.S. Pat. No. 4,835,656 to Kitahara, both of which are incorporated herein by reference as if set forth in full hereinafter. In general, the fabrication of the capacitor body is a lamination process. Ceramic sheets measuring typically around 1.5 mil in thickness are obtained in green form. A thick film of a metallic electrode paste is screen printed on each ceramic sheet. Next, the ceramic sheets are stacked, pressed, cut, and then sintered in a kiln. Finally, the terminations are disposed at each end of the capacitor body by a conventional dipping process wherein the capacitor body is dipped into a liquified metallic solution, such as silver, and then sintered in a kiln. Afterwards, the terminations may be plated by one or more metallic layers, such as a nickel and/or tin plating layer, if desired, to enhance durability, shelf life, and/or surface mounting processes.

It is often necessary to individually adjust capacitance values of components in order to custom tune a circuit. This can be accomplished via a functional trimming operation in which portions of the metallic layers in the multilayer capacitors are physically removed. Many varieties of trimming systems have been developed for this purpose and are commercially available in the art. Abrasive trimming systems and laser trimming systems are examples. Laser trimming systems have a number of significant advantages compared to the others, including better accuracy, much greater speed, and cleaner operation.

Generally, in the industry, a resistor having a very low resistance value is mounted in parallel with a laser trimmable capacitor in order to short circuit the capacitor, or render it inactive. Shorting of the capacitor isolates the capacitor circuit from the surrounding circuitry so that other circuit components and/or systems can be tested, adjusted, or tuned. Once the other components and/or systems have been tuned, the aforesaid resistor is laser trimmed to an "open" (high resistance) condition, essentially removing it from the circuit electrically. Then, the capacitor is functionally trimmed with the laser. The foregoing process is undesirable in that it requires addition of another circuit component, adding cost and decreasing circuit reliability.

SUMMARY OF THE INVENTION

The present invention is a shorted trimmable composite multilayer capacitor and method for producing the same. The shorted trimmable composite multilayer capacitor is initially shorted, but can be easily and efficiently unshorted while in circuit and then functionally trimmed. Furthermore, the shorted trimmable composite multilayer capacitor exhibits a high quality factor Q and is capable of efficient and accurate functional trimming over a wide range while in a circuit.

The shorted trimmable composite multilayer capacitor and method for producing the same can be succinctly described as follows. A plurality of interleaved first and second electrodes are spaced apart by ceramic to define a capacitor body having first and second ends. The capacitor body is sintered. A trimmable outermost electrode is disposed on the capacitor body. The trimmable outermost electrode has an electrode body extending from the first end toward the second end and stopping at a location short of the second end. A short narrow interconnect bar extends from the location where the electrode body ends to the second end of the capacitor body. Significantly, the interconnect bar shorts the capacitor and is capable of virtually complete depletion for permitting accurate functional trimming of the capacitor. After the interconnect bar has been removed, the electrode body is capable of depletion for particularly adjusting the capacitance of the capacitor.

Thus, an object of the present invention is to overcome the problems and deficiencies of the prior art as noted above in the background section of this document.

Another object of the present invention is to provide a capacitor which is initially shorted, but which can be unshorted while in circuit and then functionally trimmed.

Another object of the present invention is to provide a method for producing a shorted trimmable composite multilayer capacitor which can be unshorted and functionally trimmed while in a circuit.

Another object of the present invention is to provide a shorted capacitor which can be efficiently unshorted.

Another object of the present invention is to provide a shorted trimmable composite multilayer capacitor which is inexpensive to manufacture, easy to unshort, and reliable in both phases of operation, i.e., as a zero ohm resistor and as a trimmable capacitor.

Another object of the present invention is to provide a method for shorting and unshorting a trimmable composite multilayer capacitor which exhibits a high quality factor Q after functional trimming.

Another object of the present invention is to provide a shorted trimmable composite multilayer capacitor characterized by a capacitance which is very stable at high operating frequencies with respect to applied voltage, temperature, and life span.

Another object of the present invention is to provide a shorted trimmable composite multilayer capacitor which is user friendly in that it can be easily converted from a zero ohm resistor to a trimmable capacitor by a user while the device resides in a circuit.

Other objects, features, and advantages of the present invention will become apparent from the following description when considered in conjunction with the accompanying drawings.

BRIEF DESCRIPTION OF THE DRAWINGS

The present invention, as defined in the claims, can be better understood with reference to the following drawings. The drawings are not necessarily to scale, emphasis instead being placed upon clearly illustrating principles of the present invention.

DETAILED DESCRIPTION OF THE PREFERRED EMBODIMENT

Figure 1:
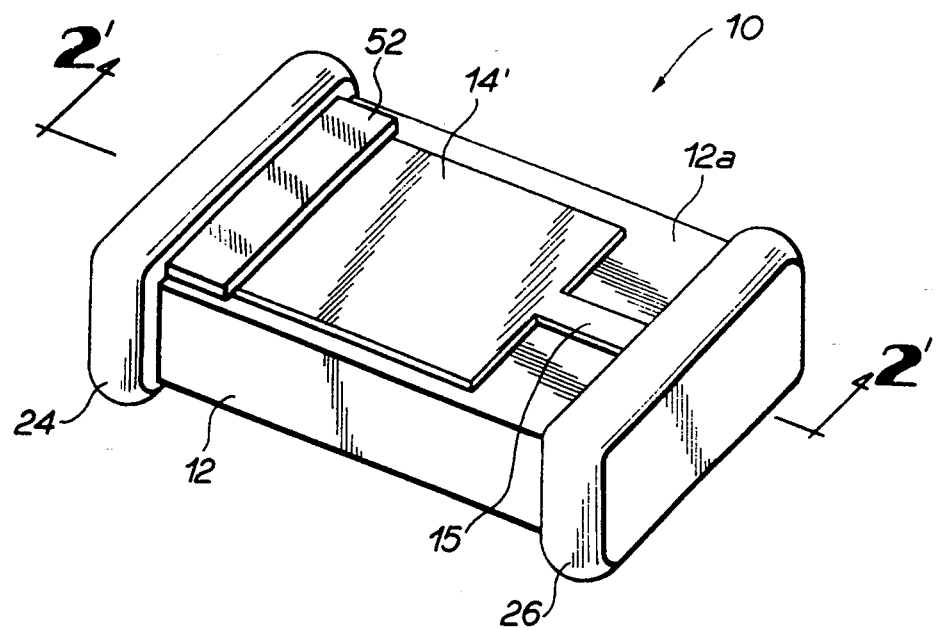
FIG. 1 is a perspective view of a shorted trimmable composite multilayer capacitor in accordance with the present invention.

With reference now to the figures wherein like numerals represent corresponding parts throughout the several views, a shorted trimmable composite multilayer capacitor 10 in accordance with the present invention is shown in FIG. 1. The capacitor 10 is fabricated in a shorted state, but can be unshorted and functionally trimmed when installed in an electrical circuit. Further, the composite multilayer capacitor 10 exhibits a high quality factor Q after a functional trimming process and permits efficient functional trimming over a wide range while in a circuit.

The capacitor 10 has a capacitor body 12 defining a fixed capacitance and has a trimmable outermost electrode 14' defining an adjustable capacitance which can be depleted so as to selectively modify the overall capacitance of the capacitor 10. The trimmable outermost electrode 14' is disposed on the outer surface of the capacitor body 12 and is adapted to be trimmed by any conventional trimming mechanism, for example, a laser or abrasive mechanism, so as to finely adjust or tune, with great accuracy and efficiency, the overall capacitance value of the composite multilayer capacitor 10.

Significantly, the capacitor 10 has an interconnect bar 15 which, in combination with the outermost electrode 14', electrically connects and shorts the terminations 24, 26 of the capacitor 10. The interconnect bar 15 is capable of virtually complete elimination via trimming, such as with a laser or other suitable device, for permitting functional trimming of the capacitor 10.

Figure 2:
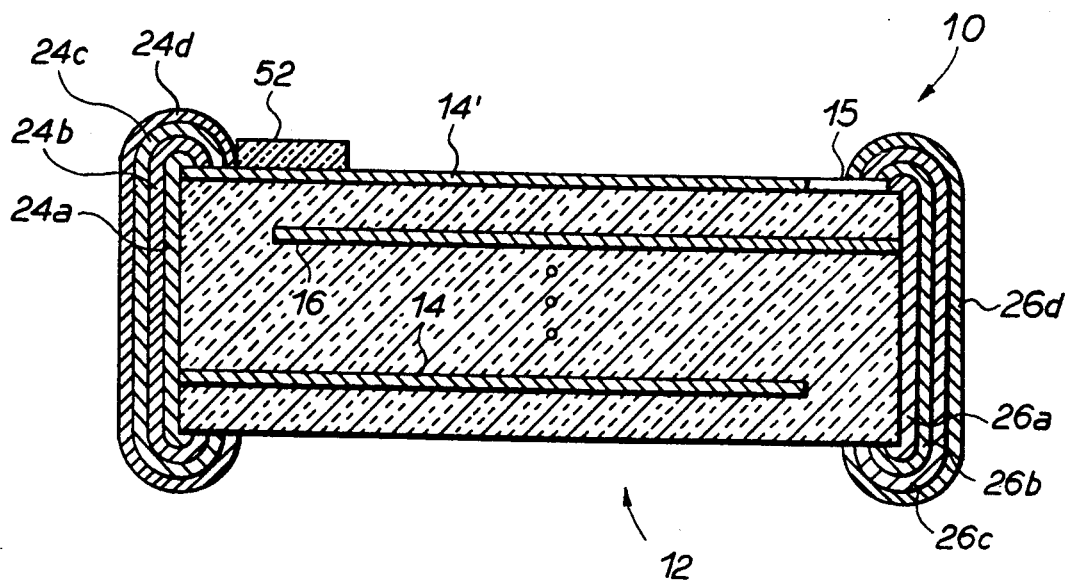
FIG. 2 is a cross-sectional view of the shorted trimmable composite multilayer capacitor of FIG. 1 taken along line 2'—2'.

The capacitor body 12 is created by a plurality of interleaved first and second ceramic layers having respective first and second electrodes 14, 16, shown in FIG. 2. There can be any number of first and second electrodes 14, 16, depending upon the ultimate capacitance which is desired. The first and second electrodes 14, 16 are connected respectively to first and second terminations 24, 26. In effect, the electrodes 14, 16 respond like a group of capacitors connected in electrical parallel between the terminations 24, 26. Moreover, the terminations 24, 26 can comprise one or more respective metallic layers 24a–24d, 26a–26d. The metallic layers 24c, 24d and 26c, 26d enhance product shelf-life and enhance product durability during soldering operations.

Figure 3A:
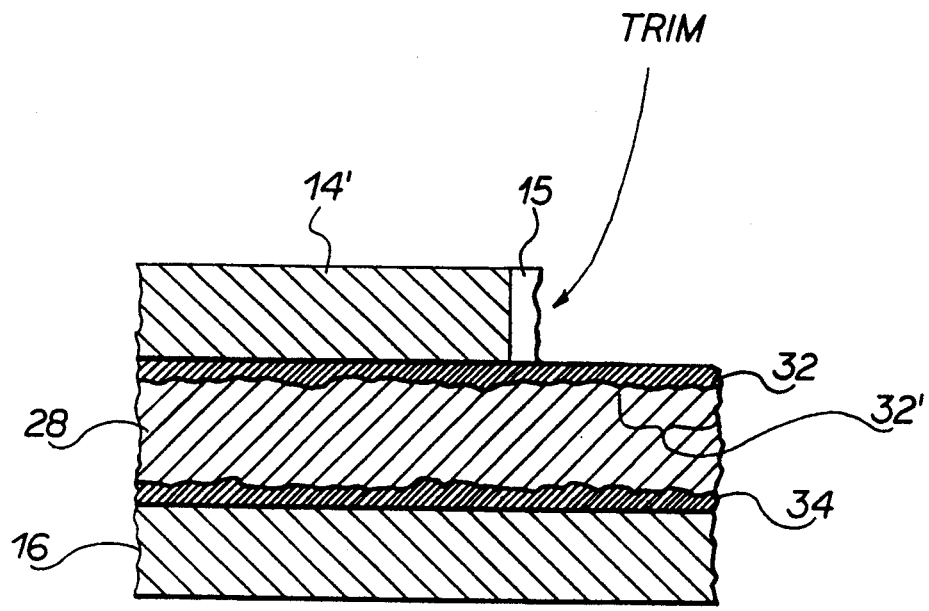
FIG. 3A is an exploded partial cross-sectional view of the top layers of an undesirable shorted trimmable composite multilayer capacitor having diffusion of an interconnect bar into the underlying dielectric layer.

In general, the fabrication of the capacitor body 12, involves a lamination process. Ceramic sheets are obtained in green form. A thick film of a metallic electrode paste is then screen printed on the ceramic sheets. Next, the ceramic sheets are stacked, pressed, cut, and then sintered in a kiln. However, in order to achieve a trimmable composite multilayer capacitor which can be efficiently and accurately unshorted and trimmed, the interconnect bar 15 and the trimmable outermost electrode 14' should not be co-fired with the various other layers of the capacitor body 12 for the following reason. If the interconnect bar 15 and the outermost electrode were co-fired with the various other layers during the sintering process, as shown in FIG. 3A, metal from the electrode 14' would undesirably diffuse into the adjacent, underlying, porous, dielectric layer 28. As a result of the diffused region 32, the capacitor 10 cannot be efficiently unshorted and also the outermost electrode 14' cannot be accurately and efficiently trimmed during the trimming process.

More specifically, consider FIG. 3A. After a portion of the interconnect bar 15 has been depleted via a laser or abrasive trimming system, a diffused region 32' remains behind. The diffused region 32' may comprise perhaps a small shorting path, a distribution of varying-sized islands of electrode material, and/or a discontinuous nonplanar residual electrode layer. The latter two conditions would result in stray capacitances of varying values which would degrade the quality factor Q of the capacitor 10.

Furthermore, the trimming mechanism cannot be easily configured to more accurately deplete the entire diffused region 32 because the diffused region 32 varies in depth. Moreover, if the power intensity of the trimming mechanism is increased too greatly, the dielectric layer 28 can be completely depleted thereby exposing the underlying electrode 16 and perhaps causing another short circuit.

Figure 3B:
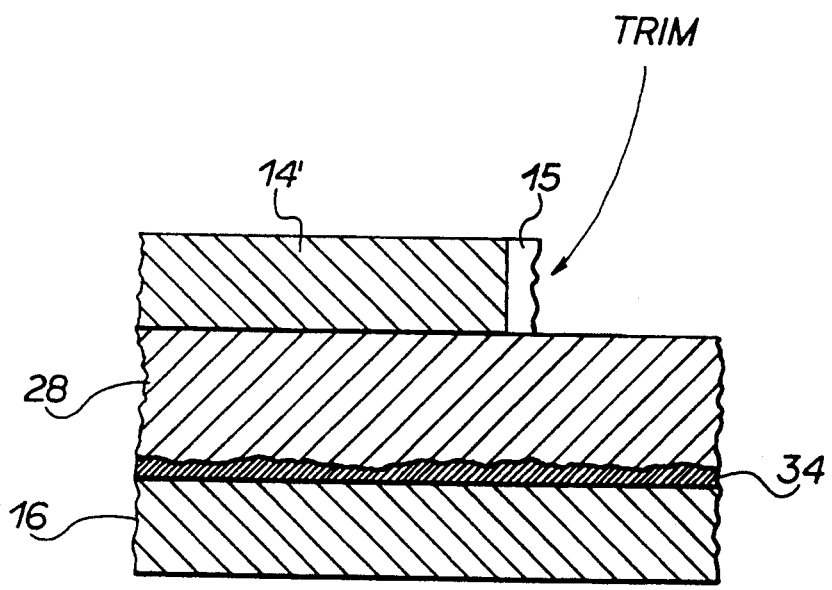
FIG. 3B is an exploded partial cross-sectional view of the top layers of the preferred embodiment of the shorted trimmable composite multilayer capacitor of FIGS. 1 and 2.

FIG. 3B shows the present invention wherein the interconnect bar 15 and the trimmable outermost electrode 14' are affixed or bonded to the previously-sintered capacitor body 12 so that the interconnect bar 15 and the outermost electrode 14' do not diffuse or migrate into the underlying dielectric layer 28 during the second, low temperature, sintering process. As a result, when the interconnect bar 15 and the outermost electrode 14' are trimmed, the metal which is concentrated strictly on the top surface of the capacitor body 12 is more accurately and efficiently eliminated, thereby resulting in precise unshorting of the capacitor 10 and in very precise adjustment of the capacitance associated with the capacitor 10.

Figure 4A:
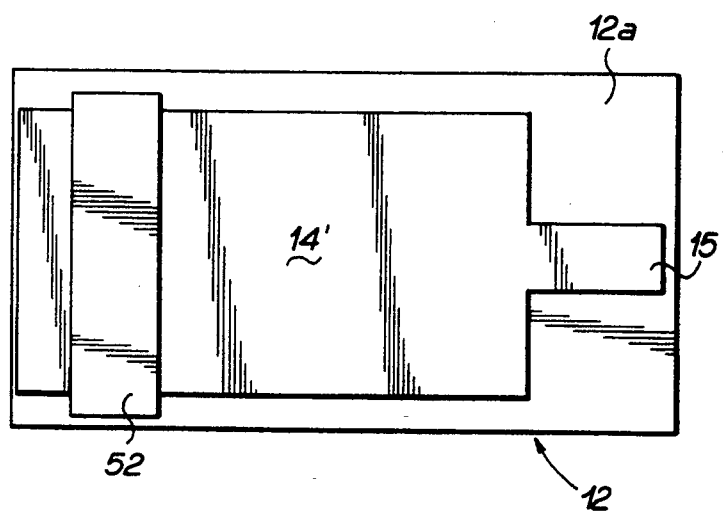
FIGS. 4A–4C are top plan views of the shorted trimmable composite multilayer capacitor of FIGS. 1 and 2 at respective successive stages during a novel methodology for producing the same.
Figure 4B:
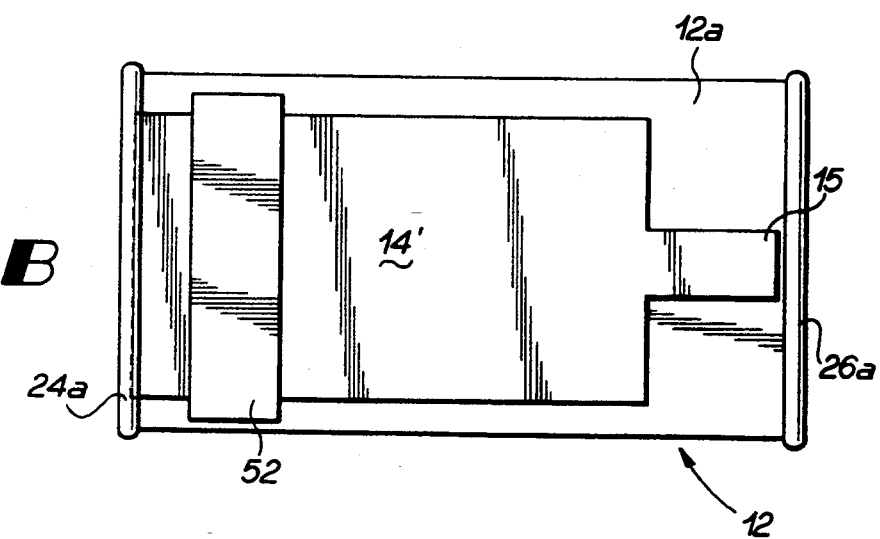
Figure 4C:
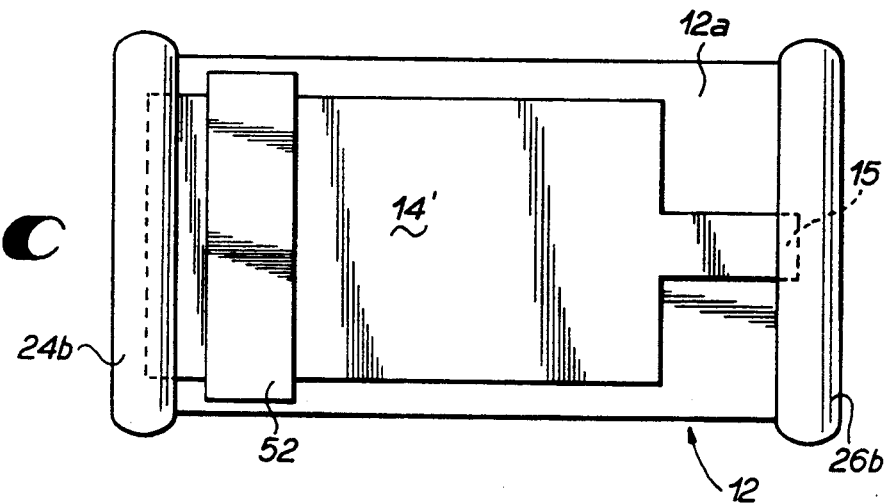

The novel process for fabricating the capacitor 10 is illustrated in FIGS. 4A through 4C and is described in detail hereafter. First, the first and second electrodes 14, 16 are screen printed as metal pastes onto 1.5 mil sheets of dielectric ceramic in green form. These layers are stacked, pressed, and cut.

Next, the stacked layers are sintered together in a kiln at a temperature approximately between 900°–1400° C. In the preferred embodiment, the stacked layers are sintered at about 1350° C.

As shown in FIG. 4A, the trimmable outermost electrode 14' and the interconnect bar 15 are screen printed as a thick film paste onto the outer surface 12a of the capacitor body 12. It should be noted that the outermost electrode 14' and the interconnect bar 15 are disposed on the capacitor body 12 in the same process although this is not required. Furthermore, the interconnect bar 15 and the outermost electrode 14' may be applied to the capacitor body 12 via any thin film process (for example, sputtering, chemical vapor deposition(CVD), or plating) or any thick film process (for example, screening).

The combination of the trimmable outermost electrode 14', the interconnect bar 15, and the capacitor body 12 are then sintered at a second temperature which bonds the outermost electrode 14' and the interconnect bar 15 to the capacitor body 12 but does not permit migration or diffusion of the metal in either the electrode 14' or bar 15 into the underlying dielectric layer 28. In order to accomplish this result, the second temperature is adjusted so that it is less than the first temperature. In the preferred embodiment, the second temperature measures approximately between 800°–900° C. Sintering the foregoing combination within the preceding temperature range will result in the desired, mutually exclusive, layer configuration shown in FIG. 3B.

Because the outermost electrode 14' and interconnect bar 15 are applied without any diffused region 32, the post-trimming quality factor Q of the capacitor 10 is optimized. As a result, a particular threshold for the quality factor Q can be achieved even by using a dielectric material having a higher dielectric constant K, contrary to the trend in the industry. In fact, a dielectric material having a high dielectric constant K relative to Class I dielectric materials may be utilized. In the preferred embodiment, a dielectric material having, for example, a ceramic with a dielectric constant K=60 is preferred. Significantly, because a dielectric material having a high dielectric constant K can be utilized, the thickness of the dielectric layers can be increased, thereby resulting in greater reliability and the volumetric efficiency of the capacitor 10 is substantially enhanced. As a further result, the trimming range of the multilayer capacitor 10 is increased.

It should be emphasized that the multilayer capacitor 10 could be created with an even higher quality factor Q by using a dielectric material having a low dielectric constant K. For example, the dielectric layers of the capacitor 10 could be made of magnesium titanate ceramic, calcium titanate ceramic, combinations of both of the foregoing materials, or any other materials which exhibit a low dielectric constant K.

Optionally, a solder barrier 52, preferably glass ($SiO_2$), may be situated externally over a portion of the trimmable outermost electrode 14' near the first termination 24 to prevent solder from covering the trimmable outermost electrode 14' during surface mounting of the composite multilayer capacitor 50. A cross-sectional view of the solder barrier 52 is illustrated in FIG. 2 for a clearer understanding of the profile of the structure.

In order to dispose the solder barrier 52 on the capacitor body 12, the solder barrier 52 is preferably screen printed as a thick film paste onto a portion of the outermost electrode 14'. The structure is then sintered in a kiln at a temperature approximately between 800°–900° C. The temperature cannot be much higher than the foregoing range or else the integrity of the electrode and dielectric layers will be adversely affected, as previously discussed. Finally, the terminations 24, 26 are applied at the ends of the capacitor body 12 via one or more dipping and/or plating processes as previously described.

Finally, as will be described with reference to FIGS. 4A–4C, the first and second terminations 24, 26 are disposed at respective first and second ends of the capacitor body 12. FIG. 4A shows the capacitor body 12 having the exterior outermost electrode 14', interconnect bar 15, and solder barrier 52 situated on top surface 12a. As shown in FIG. 4B, first termination layers 24a, 26a, for example, layers comprising silver or silver alloy, are applied to the capacitor body 12 via a conventional dipping and sintering process. The first termination layers 24a, 26a coats the ends of the capacitor body 12 and extends slightly along the lateral sides of the capacitor body 12. The dipping process is controlled to maintain a gap between the first termination layer 26a and the interconnect bar 15. In the preferred embodiment, the gap measures approximately 5 millimeters. In other words, this dipping process does not yet short the capacitor 10. At this point in the fabrication process, the capacitance value of the capacitor 10 may be tested by electrical contact with the first termination layers 24a, 26a. Testing is important for quality control and for detecting defective capacitors 10.

After testing, as shown in FIG. 4C, second termination layers 24b, 26b, for example, layers comprising a silver or silver alloy, are disposed over the first termination layers 24a, 26a via a conventional dipping process. The second termination layers 24b, 26b extend a further distance on the lateral sides of the capacitor body 12. Importantly, as illustrated in FIG. 4C, the second termination layer 26b extends over and contacts the interconnect bar 15 so as to create an electrical connection therebetween.

Preferably, a third termination layer 24c, 26c (FIG. 2), for example, a layer comprising nickel or nickel alloy, is applied via a plating process, and a fourth termination layer 24d, 26d (FIG. 2), for example, a layer comprising tin or tin alloy is applied via a plating process. The latter two layers 24c, 26c and 24d, 26d enhance product shelf life and enhance product durability during soldering operations.

Thus, after application of the various layers 24a–24c, 26a–26c of respective terminations 24, 26, the first termination 24 of the capacitor 10 is reliably connected to the first electrodes 14 and the trimmable outermost electrode 14', while the second termination 26 is connected to the second electrode 16 and to the interconnect bar 15. The combination of the electrode 14' and the interconnect bar 15 serve as an electrical shorting path between the terminations 24, 26, until the shorting bar 15 is eliminated via trimming or otherwise. After removal of the interconnect bar 15, the outermost electrode 14' may be trimmed to thereby permit tuning of the capacitor 10.

It will be obvious to those skilled in the art that many variations and modifications may be made to the preferred embodiment without substantially departing from the principles of the present invention. Accordingly, all such variations and modifications are intended to be included herein within the scope of the present invention, as set forth in the following claims.

Wherefore, the following is claimed by the inventors:

1. A trimmable composite multilayer capacitor which is shorted, but which can be easily and efficiently unshorted and functionally trimmed while in a circuit, comprising:
    a capacitor body defined by plurality of interleaved first and second electrodes spaced apart by dielectric material;
    a trimmable outermost electrode on said capacitor body capable of depletion by trimming for particularly selecting a capacitance associated with said capacitor;
    first and second terminations at respective first and second ends of said capacitor body, said first termination being connected to said first electrodes and to said trimmable outermost electrode, said second termination being connected to said second electrodes; and
    an interconnect bar connecting said outermost electrode and said second termination so that said first and second terminations are shorted, said bar capable of depletion by trimming.

2. The capacitor of claim 1, wherein said capacitor body is sintered at a first temperature and said trimmable outermost electrode and said bar are both sintered as a unitary piece to said capacitor body at a second temperature which is less than said first temperature and which prevents migration of said trimmable outermost electrode and said interconnect bar into an underlying dielectric layer of said capacitor body.

3. The capacitor of claim 1, wherein said trimmable outermost electrode comprises a thick film layer.

4. The capacitor of claim 1 exhibiting a quality factor Q, after depleting said interconnect bar but before trimming, which is greater than 100 at an operating frequency of about 400 MHz or less.

5. The capacitor of claim 1, wherein said dielectric material comprises magnesium titanate ceramic.

6. The capacitor of claim 1, wherein said dielectric material comprises calcium titanate ceramic.

7. The capacitor of claim 1, wherein said dielectric material has a dielectric constant of 60.

8. The capacitor of claim 2, wherein said first temperature is approximately between 900 and 1400 degrees Celsius.

9. The capacitor of claim 8, wherein said second temperature is approximately between 800 and 900 degrees Celsius.

10. A trimmable composite multilayer capacitor which is shorted, but which can be easily and efficiently unshorted and functionally trimmed while in a circuit, comprising:
    a capacitor body defined by a plurality of interleaved first and second electrodes spaced apart by dielectric material and sintered together at a first temperature, said capacitor body having opposing first and second ends;
    a trimmable outermost electrode situated on said capacitor body and capable of depletion by trimming for particularly selecting a capacitance associated with said capacitor, said trimmable outermost electrode having an electrode body extending from said first end toward said second end and stopping at a location short of said second end and having an interconnect bar connected to said trimmable outermost electrode and extending from said location to said second end, said electrode body and said bar being sintered to said capacitor body at a second temperature which is less than said first temperature, so that said electrode body and the interconnect bar are prevented from migrating into said capacitor body, said interconnect bar for shorting said capacitor and capable of elimination for permitting functional trimming of said capacitor; first and second terminations situated at respective first and second ends of said capacitor body, said first termination being connected to said first electrodes and to said electrode body, said second termination being connected to said second electrodes and to said interconnect bar; and
    wherein said first and second terminations are electrically connected via the combination of said electrode body and said interconnect bar and whereby said interconnect bar is capable of elimination via trimming to thereby permit modification of said capacitance of said capacitor via functional trimming of said electrode body.

11. A method for producing a shorted trimmable composite multilayer capacitor which can be unshorted and functionally trimmed while in a circuit, comprising the steps of:
    configuring a plurality of interleaved first and second electrodes spaced apart by dielectric material to define a capacitor body having first and second ends;
    sintering said capacitor body;
    disposing a trimmable outermost electrode on said capacitor body, said outermost electrode having an electrode body extending from said first end toward said second end and stopping at a location short of said second end and having an interconnect bar extending from said location to said second end, said electrode body capable of depletion for particularly adjusting a capacitance associated with said capacitor, said interconnect bar for shorting said capacitor and capable of depletion for permitting functional trimming of said capacitor;
    sintering said capacitor body having said outermost electrode and said interconnect bar; and
    disposing first and second terminations at respective first and second ends of said capacitor body, said first termination being connected to said first electrodes and to said electrode body, said second termination being connected to said second electrodes and to said interconnect bar.

12. The method of claim 11, further comprising the following steps of:
    forming a first termination layer at said first end of said capacitor body in contact with said electrode body;
    forming a second termination layer at said second end of said capacitor body so that a gap exists between said second termination layer and said interconnect bar;
    measuring said capacitance of said capacitor; and
    forming a third termination layer at said second end of said capacitor body in contact with said second termination layer and said interconnect bar so that said capacitor is electrically connected between said first and second terminations.

13. The method of claim 11, further comprising the step of applying both said trimmable outermost electrode and said interconnect bar as a single unitary piece via a thick film process.

14. The method of claim 11, wherein said capacitor exhibits a quality factor Q before functional trimming which is greater than 100 at an operating frequency of about 400 MHz or less.

15. The method of claim 11, wherein said dielectric material comprises magnesium titanate ceramic.

16. The method of claim 11, wherein said dielectric material comprises calcium titanate ceramic.

17. The method of claim 11, wherein said dielectric material has a dielectric constant of approximately 60.

18. The method of claim 11, further comprising the step of positioning a solder barrier externally over a portion of said electrode body near said first termination to prevent solder from covering said electrode body.

19. The method of claim 11, wherein said capacitor body is sintered at a temperature which is approximately between 900 and 1400 degrees celsius.

20. The method of claim 18, further comprising the steps of:

screen printing said solder barrier in paste form over said electrode body; and sintering said solder barrier at a temperature approximately between 800 and 900 degrees celsius.

21. The method of claim 19, wherein said outermost electrode and said interconnect bar are sintered at a temperature approximately between 800 and 900 degrees Celsius.

* * * * *

UNITED STATES PATENT AND TRADEMARK OFFICE
CERTIFICATE OF CORRECTION

PATENT NO. : 5,345,361
DATED : September 6, 1994
INVENTOR(S) : Billotte et al.

It is certified that error appears in the above-indentified patent and that said Letters Patent is hereby corrected as shown below:

On the front page under U.S. Patent Documents, delete "McLaney" and insert -- McLarney --.

In column 4, line 9, delete "axe" and insert -- are --.

Signed and Sealed this

Fifteenth Day of November, 1994

Attest:

BRUCE LEHMAN

Attesting Officer    Commissioner of Patents and Trademarks